US005764906A

United States Patent [19]
Edelstein et al.

[11] Patent Number: 5,764,906
[45] Date of Patent: Jun. 9, 1998

[54] UNIVERSAL ELECTRONIC RESOURCE DENOTATION, REQUEST AND DELIVERY SYSTEM

[75] Inventors: Matthew Edelstein, Arlington; Samuel Bergman, Alexandria, both of Va.; Donald B. Rubin, Silver Spring, Md.

[73] Assignee: Netword LLC, Arlington, Va.

[21] Appl. No.: 554,775

[22] Filed: Nov. 7, 1995

[51] Int. Cl.$^6$ ............................................. G06F 13/14
[52] U.S. Cl. .................. 395/200.49; 395/200.55; 395/200.33
[58] Field of Search .................. 395/200.01, 200.02, 395/200.1, 200.09, 200.49, 200.55, 200.33, 200.8, 200.58

[56] References Cited

U.S. PATENT DOCUMENTS

| | | | |
|---|---|---|---|
| 4,677,588 | 6/1987 | Benjamin et al. | 395/200.58 |
| 4,718,005 | 1/1988 | Feigenbaum et al. | 395/200.1 |
| 5,282,244 | 1/1994 | Fuller et al. | 379/230 |
| 5,388,213 | 2/1995 | Oppenheimer et al. | 395/200.01 |
| 5,434,974 | 7/1995 | Loucks et al. | 395/612 |
| 5,586,257 | 12/1996 | Perlman | 463/42 |

OTHER PUBLICATIONS

A practical method for achieving portable communications in the internet context by Qu et al., 1995 IEEE publication, pp. 1512–1516.

*Primary Examiner*—Parshotam S. Lall
*Assistant Examiner*—Z. Maung
*Attorney, Agent, or Firm*—Fulbright & Jaworski LLP

[57] ABSTRACT

A universal electronic resource denotation, request and delivery system allows a user to locate information on a distributed computer system or network such as the Internet by knowing or guessing a short mnemonic alias of an electronic resource without the user having to know the physical or other location denotation such as the universal resource locator (URL) of the desired resource. The system hardware includes a client computer, a local server, a central registry server, a value added server, and a root server. The universal electronic resource denotation, request and delivery system supports a personal aliasing (nicknaming) feature, a universal resource accessing feature for finding location information such as URLs relating to a query term, a "see also" feature for including information about related documents or resources within the record of a resource, a feature for updating local servers and client machines by periodically deleting those records which have changed, a "try again" and "mirroring" feature for aiding a user in obtaining the resource under adverse hardware or software conditions, and an authentication and administration feature that allows a user to administer the aliases and related data which pertain to his/her resources.

31 Claims, 6 Drawing Sheets

UNIVERSAL ELECTRONIC RESOURCE DENOTATION, REQUEST AND DELIVERY SYSTEM

BACKGROUND OF THE INVENTION

1. Field of the Invention

The field of the invention is that of a Network in which Electronic Resources are shared among such a system's community of users. A Network is a distributed communicating system of computers which are interconnected by various electronic communication links and computer software protocols. Electronic Resources are (a) documents, files and/or other information sources which are accessible on a Network to its user community, or (b) references to and/or means of accessing such documents, files and/or information sources. The invention relates to a system for denoting (naming) the Electronic Resources of a Network and a related system for the fulfillment of requests for and/or execution of delivery of these Electronic Resources to users of the Network's user community.

2. Description of the Related Technology

A particularly well-known Network is the international information infrastructure, commonly called the Internet. The Internet is a world-wide Network whose Electronic Resources include (but are not limited to) text files, graphic files in various formats, World Wide Web "pages" in HTML (HyperText Mark-Up Language) format, files in various and arbitrary binary formats, and electronic mail addresses. As in many other Networks, the scheme for denotation of an Electronic Resource on the Internet is an "electronic address" which uniquely identifies its location within the network and within the computer in which it resides. On the Internet, for example, such an electronic address is called a Universal Resource Locator or URL, and consists of a specially formatted concatenation of information about the type of protocol needed to access the resource, a Network Domain identifier, identification of the particular computer on which the Electronic Resource is located, a port number, directory path information within the computer's file structure, and the file name of the resource.

Internet URLs and similar denotation schemes for Electronic Resources are cumbersome for human users. URLs are often more than 50 characters long and contain information which is neither interesting nor meaningful to seekers of information. For example, the NASA Internet web "homepage" has the URL "http://hypatia.gsfe.nasa.gov/NASA_homepage.html."

The National Information Control (NIC) registers unique Internet domain names on a first come first served basis. Even if an entity can acquire a domain name which is mnemonic and easy to remember, the URLs associated with that domain may still be complex non-intuitive character sequences. Sometimes an entity cannot register a desired domain name because another entity has already registered that domain name with the NIC. The entity must then choose an alternate domain name, which often results in difficulty in finding that entity's Electronic Resources on the Internet. Additionally, due to length, software, and practicality considerations, domain names are often peculiar abbreviations, presenting additional confusion in locating an entity's Electronic Resources on the Internet. Furthermore, many entities do not possess their own computing equipment nor domain names, and must maintain their Electronic Resources in the domains of other entities, as in this example of a URL: "http://draco.centerline.com:8080/~franl/crypto.html," which denotes a web page on privacy and cryptography.

Thus, several difficulties face users attempting to locate Electronic Resources on a Network with a denotation system such as that in use on the Internet. They include the length, complexity and non-intuitive nature of denotations (URLs on the Internet), the need to type them correctly, and the difficulty in learning of the existence of the Electronic Resource and in discovering its correct denotation or URL.

Various software tools to facilitate the search for URLs have been proposed or developed for use on the Internet. These include "Yellow Pages," "White Pages," and "Web Crawlers." They all deal with compiling and maintaining classification systems of Electronic Resources on a Network. They all attempt to create and/or maintain a utility which presents an indexing scheme to a user so that he/she may learn of the existence of an Electronic Resource and retrieve its electronic address (or URL). "Yellow Page" indexes classify Electronic Resources by a hierarchy of subject areas in a manner similar to the telephone "yellow pages" or a library classification scheme. "White Page" indexes classify Electronic Resources by owner or name of the resource. These schemes inherit all the difficulties of classifying potentially huge name spaces, including the difficulties arising from overlapping and non-hierarchical subject areas and overlapping name spaces.

The Yellow Page approach suffers from the phenomenon of overlapping subject areas which occurs in any classification scheme. This can be illustrated by the difficulty of deciding whether to place "educational psychology" under "education" or "psychology" and that of classifying a document on Democracy and Fascism in Spain under possibly disparate subject areas of "democracy" or "fascism" or "Spanish history" in a classification scheme. These difficulties are well known in Library Science. The White Page approach is to classify by provider or owner. This is an excellent scheme providing that the information seeker knows the name(s) of potential providers of Electronic Resources. Neither of these schemes address the problem of complexity of the denotation of Electronic Resources. In some cases, the denotation need not be seen or dealt with by the user, as in the case of hypertext links ("hot links") within Internet Web pages. Web software automatically retrieves documents referred to in other documents without user intervention or entry of URLs. Web software ("browsers") also are able to retain URLs of Web pages in a user-created (usually hierarchical) classification scheme, and list these by page titles. This capability allows users to revisit (retrieve at a later time) web pages previously retrieved, as they may have changed.

Web crawlers and other search engines attempt to create indexes of the yellow or white page variety, together with their attendant classification scheme, by continually traversing Electronic Resources in a Network and compiling information about the resources encountered. In an environment similar to the World Wide Web in which documents link to other documents, search engines are able to extract the links from documents in order to extend their search to other documents. Various means are used to extrapolate subject areas and other classification schemes, ranging from author-provided keyword or indexing information through expert system techniques for ferreting index information from textual context. These engines participate in the construction apparatus for indexes such as yellow or white pages.

Some Networks include protocols such as the Internet "Finger" for finding an electronic mail address of a person. These protocols and their attendant software have the drawback of being unable to search a very large e-mail address space, and thus require additional information for their search, such as a Domain Name in the Internet. Other Internet protocols such as "Who Is" request registered information about different Domains (from NIC in the Internet).

Thus, there are many tools in Networks for locating and classifying Electronic Resources. All deal with using user-provided information regarding the subject matter, owner or electronic location of an Electronic Resource in order to identify its electronic address (URL in the Internet). Other tools attempt to create, update or extend such classification systems automatically by continually searching the Network's Electronic Resource space. Still other tools construct and retain user-classified lists of these addresses for later use.

SUMMARY OF THE INVENTION

Using current technology, an user of a resource-sharing distributed or networked computer system such as the Internet cannot quickly and conveniently locate and access a specific network resource unless the user knows the precise network address of the desired resource. Indexes assist users in locating such resources, but as information grows exponentially, indexes are larger and thus more difficult to traverse and may not be able to remain current. Information providers may choose to advertise electronic addresses of their resources (such as URLs on the Internet) by other means (newspapers, radio, television and other media, for example); electronic addresses advertised by these means are often cumbersome and difficult to remember, especially since they are often expressions of physical locations of resources and include non-intuitive arbitrary-seeming information. Seekers of information thrive on short mnemonic denotations for informational resources. In the telephone system this is demonstrated by competition for use of scarce alphabetically meaningful telephone numbers such as "800-FLOWERS," and on the Internet it is demonstrated by competition for mnemonic Domain names such as "www.ibm.com."

This invention deals with a mnemonic denotation system for Electronic Resources on a Network such as the Internet and a concomitant system of request and delivery services for these Electronic Resources. Specifically, this invention is a system for providing and maintaining short aliases for information resources and their providers and a system for translation of these aliases to meaningful electronic addresses such as URL's, facsimile and voice telephone numbers and electronic mail addresses, and for accessing the resources by means of these addresses.

The system according to the invention need not implement an information utility, nor need it store the information which information providers make available to user communities. Nor does a system according to the invention need to classify or index information in such a utility or network. This invention concerns itself primarily with a system for "aliasing" information resources with short mnemonic names chosen by the information providers and with a system for providing users with pointers to (access to) the information or actually delivering the information in a variety of formats on behalf of the information providers.

1. Definitions

A Network is a distributed communicating system of computers which are interconnected by various electronic communication links and computer software protocols for the purpose of sharing files, documents and other electronic resources among its community of users (such as the Internet).

An Electronic Resource is (a) a document, file and/or other information source which is accessible on a Network to its user community, or (b) a references to and implied means of accessing such a document, file and/or information source; thus, a text file, a web page, a Telnet connection, and an e-mail address are Electronic Resources; a URL on the Internet is also an Electronic Resource.

An Address is a character sequence which can be used directly to locate, communicate with and access an Electronic Resource, such as a URL on the Internet, an e-mail address, or a voice or facsimile telephone number.

A Denotation of an Electronic Resource is a name for that resource chosen by a naming convention delineated below.

A Request and Delivery System is the distributed software system delineated in this document for uncovering the "address" on an Electronic Resource in a Network, and for transporting or transmitting that resource in some desirable form to the requester.

Mnemonic means a denotation which is intended to be easy to remember for human users.

2. Objects of the Invention

An object of this invention is to a provide shortened, convenient, mnemonic method for denoting and accessing Electronic Resources on a Network such the Internet. Another object of this invention is to provide a distributed computer system that implements this method by associating (mapping) mnemonic denotations of Electronic Resources with their electronic addresses (such as URLs) and retrieving Addresses associated with the Denotations of the invention. Another object of this invention is to provide a mechanism for assuring that every Denotation of an Electronic Resource of a Network is unique within the Network and controlled by the owner and/or provider of the resource. Another object of this invention is to facilitate and/or provide a mechanism for the delivery of Electronic Resources associated with Denotations to users by electronic or other means. Still another object of this invention is to provide mechanism for users to identify the Denotations of Electronic Resources of an information provider. A further object of the invention is to provide a mechanism and distributed software system for guaranteeing that the mnemonic Denotations of Electronic Resources remain current and are continually associated with their correct physical or electronic Addresses and/or locations even when these Addresses or locations change.

3. Denotation Method for Information Resources

At the core of this invention is a system for associating any Electronic Resource within a Network with a special Denotation made up of a unique sequence of characters. For purposes of description herein, the Denotation of a particular Electronic Resource shall be referred to as its "Resource Alias." A Resource Alias includes a sequence of characters which together attempt to describe the resource in a mnemonically meaningful way. The system according to the invention may require a Resource Alias to always begin with a character sequence identifying the provider of an Electronic Resource which shall be referred to herein as a "Source Alias."

Source Aliases are made unique by constricting each Source Alias to exactly one information provider, be it an organization or an individual. A Source Alias uniquely describes and denotes the owner, source or distributer of the resource. Fictional examples of Source Aliases may be "US Senate," "IBM," "Harvard University" and "Red Cross." An information provider may create Resource Aliases by appending a separator character and another sequence of characters to his/her Source Alias. Each Resource Alias uniquely denotes and represents an Electronic Resource, while many Electronic Resources may be associated with each Source Alias. Fictional examples of Resource Aliases might be "US Senate/Dole Bio" and "XYZ Appliance Company/four-slice toaster," wherein the separator character is 'slash' ('/'). The first example might be the Resource Alias associated with a biographical sketch of Senator Dole provided by the U.S. Senate, while the second might be a description of a particular toaster vended by the XYZ Appliance Company.

Source Aliases may be made unique by their registration in a central registry. Resource Aliases may be constructed by information providers. Both Source and Resource Aliases are expected to be Mnemonic and easy to convey to information seekers. It is also expected that entities will want to use short Source and Resource Aliases whenever possible. For example, the U.S. Department of Defense may desire to use "DoD" or "US DoD" as a Source Alias rather than (or in addition to) using its complete name. Some commonly used character strings may be reserved for use as Source Aliases or Resource Aliases by public entities and advertised as such; an example might be "911/poison."

In order to extend the name range for Source and Resource aliases, various non-alphabetic characters shall be allowed in their expression. Thus, for example, "Smith&Jones," "USA Today," and "CBS!" may be valid Source Aliases, while "MicroSoft/C++," "Boeing/767 Info," "IBM/PC=Value," and "Chase Manhattan/$Exchange" might be valid Resource Aliases. A system according to the invention may display a predetermined grammar and include a reserved vocabulary.

4. Central Registry of Denotations

According to the invention, there will be a central registry system for registration of Source Aliases. In addition, Resource Aliases may also be specified on a central registry system. Source Aliases would preferably be chosen on a first-come first-served basis, but there could be some criteria which prevents information providers from assuming Source Aliases which commonly indicate any well known public entity such as a national or international corporation or a non-profit or governmental agency. Aliases which denote information resources must be centrally registered for two reasons. First, in order to guarantee uniqueness, particularly of Source Aliases. Secondly, in order to allow Resource Aliases to be globally associated with the correct Addresses of the Electronic Resources they denote, and so that these associations may be made accessible to all users of the Network.

5. The Software and The Software Sites

The implementation of this invention comprises a distributed computer system including different computer and software implemented systems which communicate with each other on their Network. The description of this invention shall refer to various types of Network sites (computers) which are partially configured by and shall contain and operate according to different software programs. These sites shall be referred to as a "Central Registry" (the unique site which is responsible for registration of Source and Resource Aliases), "Clients" (computers such as workstations and personal computers used by human users), "Local Servers" (intermediate Network nodes to which Clients may be connected to and which provide immediate service for Clients), "Root Servers" (computers which contain essentially the same information as the Central Registry and provide this information to other computers so as to distribute the load which would otherwise fall on the Central Registry computer), and "Value Added Servers" (computers which provide additional services to Clients and their users as described below). The aggregate of software of this invention shall have component programs at each of these types of sites, and these component programs shall work in concert in order to provide the stated operational features to users and meet the stated objects of this invention.

The Central Registry is the site wherein the official versions of all Source and Resource Aliases, together with any relevant information associated with them, shall reside. It is the responsibility of this site to store and disseminate all Resource Alias-related information, to register new Source Aliases and Resource Aliases for information providers, and to allow Resource Alias-related information to be updated by information providers.

The Root Servers may be sites which "mirror" the Central Registry, in that they disseminate Resource Alias-related information. They are periodically updated by the Central Registry, but do not in themselves register Source or Resource Aliases, nor do they allow direct updating of Resource Alias-related data by information providers.

The Local Servers are so-called "nodes" in the Network in question. This type of site serves as an intermediary dissemination point for Resource Alias-related information. This type of site shall "cache" Resource Alias-related information (store such information for some period of time or while this information continues to be accessed at a reasonable rate). Thus, the aggregate of Resource Alias-related information at such a site directly reflects the level of use or access of a particular subset of the totality of Resource Aliases by Client computers and users which connect to such a site.

Clients are used by information providers in order to make their resources accessible to users by registering Source and Resource Aliases and providing information associated with those Aliases. The Client sites retain a collection of recently used Resource Aliases and their related data including, but not limited to, the Addresses of the Electronic Resources associated with the Resource Aliases and descriptions of those Resources. The site is able to present the Resource Alias-related data to users, accept requests for retrieval of Resource Alias-related data, and invoke other software which may be resident on the same or other computers (such as World Wide Web browsers) in order to actually retrieve the Resources which the Resource Aliases represent. Client site requests for Resource Alias-related data are relayed to Local Servers which may either have such data cached (locally stored) or which may in turn request that information from the Central Registry or a Root Server on behalf of the Clients. The Client site may also accept requests for registration of new Resource or Source aliases on behalf of their users (who happen to be information providers) and submit those requests to the Central Registry (possibly via a Local Server). An important feature of the Client site is the ability to accept user requests for the "delivery" of the Electronic Resource associated with a Resource Alias. The satisfaction of this type of request may, take on several forms, including but not limited to: (1) invoking a software program such as a web browser, Gopher program or FTP (file transfer program) to access the document or resource, (2) sending a request to a Value Added Server to transmit the Resource in question to the user by postal service, electronic mail or facsimile, and (3) sending a request to a special server which provides direct voice telephone transmission of the information in the Resource to the user (either by human voice or by synthetic electronic voice). Information providers may elect to themselves pay for such delivery services of their Resources to the general user community of the Network, or they may elect to provide the information on the condition that the recipient pay for the delivery services.

Value Added Servers provide various types of delivery services to clients, employing a number of electronic or non-electronic means, such as facsimile, telephone and postal service. Thus, a user may request of his Client site to have a text file associated with him/her bar Resource Alias sent to him/her by facsimile, or in printed form by postal service (mail), or by electronic mail, or (where relevant) read to him/her over the telephone. The Client site then relays such a request to the relevant Value Added Server site to have it fulfilled. Thus, a Resource Alias embodies a universal means of accessing the information associated with it.

This invention includes the individual modules at the aforementioned sites as well as the aggregate of the system which permits the individual sites to communicate with each other and act in concert as a system. The software imparts operating capacity to the sites which carry out the aforementioned primary functions as well as the additional functions delineated below. The various Server and Client sites mentioned are not intended to necessarily be special dedicated computers added to a Network in order to execute only the programs of this invention. Rather, they may be the computers already extant within the Network, augmented by the individual software programs and the aggregate of software of the invention in order to extend the utility of the Network.

6. Information Associated with a Resource Alias

A Resource Alias is a denotation of an Electronic Resource within a Network such as the Internet. Each Resource Alias has data associated with it, and is stored in the Central Registry. The data associated with a Resource Alias shall be termed the Resource Alias Record. Various other Server and Client sites also store certain Resource Aliases and their related Resource Alias Records. According to a preferred embodiment, a Resource Alias Records may include, but is not limited to, the following: the Address (or URL) of the Electronic Resource which the Resource Alias denotes, a description of the resource, a list of Resource Aliases of related Electronic Resources together with some minimal descriptive material, the last time and date when the Resource Alias Record was updated or changed, the time and date after which the Resource Alias and its record shall no longer valid, information about the owner or provider of the resource, and information about the format and/or type of document or resource in question (for example, text file, graphic file of a specific format or, web-page). Whenever a Local Server requests a Resource Alias from the Central Registry or a Root Server and whenever a Client computer requests such information from a Local Server, the aggregate of information delineated above (the Resource Alias Record) is transmitted to the requester.

7. Additional Functions of the Invention

In addition to the above-mentioned operations of the individual sites and of their aggregate systemic operation, the system according to the invention may provide additional functionalities. These are: (1) mechanisms for assuring that Resource Alias-related information is kept up-to-date in its various component systems; (2) mechanisms for assisting users in guessing or identifying Source and Resource Aliases associated with a particular information provider; and (3) mechanisms for providing users with the ability to invent and use even shorter mnemonic characters strings for representing and later accessing Electronic Resources.

The mechanism for keeping a Root Server up-to-date with respect to the Resource Aliases and Resource Alias Records it stores locally includes a periodic communication with the Central Registry, receiving updated Resource Aliases and Resource Alias Records, and updating its own database of such Resource Aliases and Resource Alias Records.

The mechanisms for keeping Local Servers up-to-date with respect to the Resource Aliases and Resource Alias Records they store locally may include the following: (1) A periodic inquiry in which a Local Server sends a list of its locally cached (stored) Resource Aliases to the Central Registry or to a Root Server, together with the times and dates when each of these Resource Aliases was last updated at that Server; in return the Central Registry or Root Server sends back a list of those Resource Aliases which are "out of date" (their associated data has since changed); the Local Server then deletes the out-of-date Resource Alias Records from its local cache. (2) Whenever a Client reports to a Local Server that it was not able to locate an Electronic Resource by using the Resource Alias Record Address it had been previously given, the Local Server will request an update of that information (the Resource Alias Record) from the Central Registry or from a Root Server and transmit it to the Client.

The mechanisms for keeping the Client computers up-to-date with respect to the Resource aliases and Resource alias Records they store locally may include the following: (1) a periodic inquiry in which a Client send a list of its locally cached (stored) Resource Aliases to its Local Server together with the times and dates when each of these Resource Aliases was last updated; in return the Local Server sends back a list of those Resource Aliases which are "out of date" (their associated data has since changed). The Local Server may need to, in turn, request such information from a Root Server or the Central Registry if it no longer retains some of the Resource Aliases or their Records. The Client computer then deletes the out-of-date Resource Alias Record from its local cache. (2) Whenever a Client attempts to use its locally stored Resource Alias Records (particularly, an Address or URL) for accessing an Electronic Resource and this attempt fails because the Address information is no longer correct, the (human) user is informed of this state of affairs and he/she is able to request updated information from the Local Server as above (by a simple action such as clicking on a button marked "Try Again").

The mechanism for registration of new Source Aliases will operate on a first come first serve basis wherein any information provider entity may request the use of a character string as a Source Alias for that entity. The character string is approved if (1) it is unique and (2) it conforms to the acceptable syntax for Source Aliases. Thereafter, the provider may choose any unique character string extension to formulate Resource Aliases for his/her resources so long as they conform syntactically and are indeed unique.

The mechanism for assisting users in guessing or identifying Source and Resource Aliases associated with a particular information provider may include the following: If a user (or the Client computer on behalf of the user) requests a Source Alias or Resource Alias which does not actually exist (is not on record at the Central Registry or at a Root Server), the Root Server or Central Registry shall attempt to match the character string submitted by the user with existing Source Alias and Resource Aliases, and it shall provide a list of possible candidate Source and Resource Aliases for the user. This communication may be performed via the Local Server. The user may then peruse the list of Aliases thus provided and possibly the information in the Resource Alias Records associated with these Resource Aliases in order to determine if any of these denote the desired Electronic Resource. Various algorithms which deal with intelligently constructing candidate lists of Resource Aliases and/or Source aliases by locating Aliases which are visually and syntactically similar to the requested Alias.

The mechanism for providing users with the ability to invent and use even shorter mnemonic characters strings for representing and later accessing Electronic Resources may include the following: The Client site shall allow a user to create any characters sequence and associate that sequence with a Resource Alias or Source Alias stored (cached) at his Client computer. This sequence is termed a Nickname. Typing or otherwise entering or choosing this Nickname will have the same effect in the software as entering or choosing the Resource Alias which it denotes or represents. Thus, for example, a user may have cached the Resource Alias "General Motors/new car prices" and chosen a Nickname "GM$" for this Resource Alias—the use of these two character strings in calling up a Resource Alias Record or eliciting an Electronic Resource Address shall have the identical effect.

8. Use of Serial Numbers

Each Resource Alias may be associated with a unique serial number. This number is assigned by the Central Registry upon initial approval of the Resource Alias, and is used when transmitting lists of Resource aliases, wherein a list of serial numbers will be transmitted in place of the Resource Aliases in order to decrease the bandwidth required for such transmission. This is used when both parties involved in the transaction are able to ascertain the Resource Alias from its serial number.

The number space for the serial numbers is sufficiently large so that there is no need to reuse a serial number even if the Resource Alias with which it was originally associated is no longer in use. Serial numbers are assigned sequentially within the number space by the Central Registry Server.

9. Scope and Scale of the Invention

This invention may be implemented in networks and distributed systems of varying scope and scale. The various sites described, including Central Registry, Root Server, Local Server, Client and Value Added Server, may well be located at separate sites and separate computers in a large distributed system. However, the various servers and clients described are actually processes running on various computers and interacting so as to form one distributed system. In smaller implementations, some or all of the various servers described may actually be processes running on the same computer. In the most degenerate case, there would be a single Central Registry computer which would directly serve Client computers, providing Central Registry services and Local Server services simultaneously. It could also provide the various Value Added Services which might otherwise be provided by processes executing on separate networked computers. Root Servers are not actually needed in small scale systems wherein the Central Registry Services provided by the Central Registry Server suffices to respond adequately to all requests in a timely manner. Thus, the various servers are actually cooperating processes, and these may cooperate within a single site or computer or across distributed or networked systems. The only proviso is that the Client processes located in disparate computers serving their human users and communicating with a Server providing the services described as those provided by Central Registry, Local Server and Value Added Server.

BRIEF DESCRIPTION OF THE DRAWINGS

The drawings described here relate to a generic and specific implementation of the invention.

DETAILED DESCRIPTION OF THE PREFERRED EMBODIMENT

Figure 1:
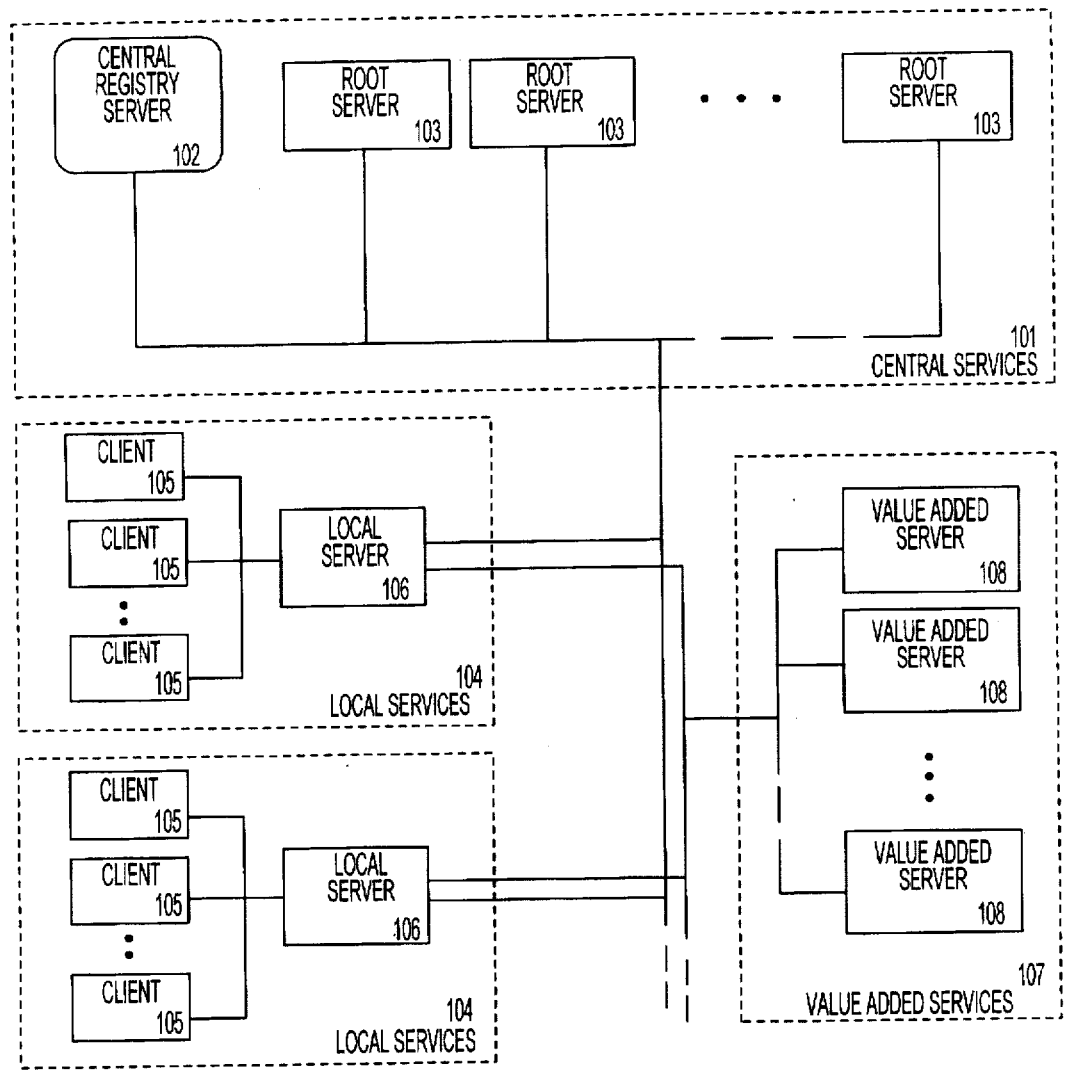
FIG. 1 shows a schematic view of an embodiment of the invention.

FIG. 1 depicts a systemic view of the invention, in which the various regions are Servers and/or Clients grouped according to their systemic function. The Central Services region 101 includes a Central Registry server 102 set of Root Servers 103 which provide a central repository for all Resource Aliases and their associated records; the servers in this region transmit the record of a given Resource Alias on request, provide lists of proximate Resource Aliases when a request is made for the record associated with a character sequence which is not a valid Resource Alias, and accept new requests for Resource Alias registry wherein they add the requested Resource Alias and its record to the repository. The Local Services region 104 includes Clients 105 which may require various services; in the full large scale implementation, these services are mediated, for each Client, by a Local Server 106 which also caches such Resource Aliases and associated records which have a high local demand. The Value Added Services region 107 includes a set of servers 108 which provide delivery of Electronic Resources on behalf of their owners or distributors by various electronic and nonelectronic means on request of Clients or their intermediaries.

Figure 2:
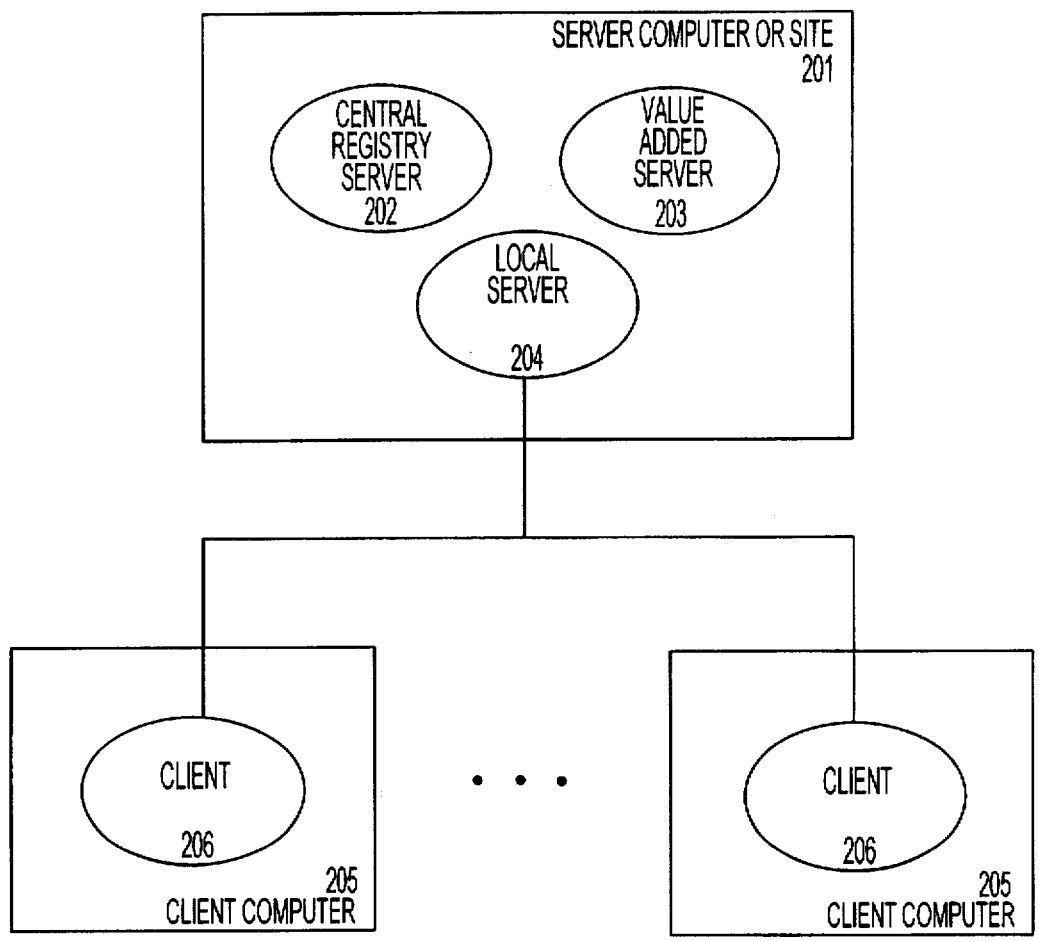
FIG. 2 shows a small scale implementation.

FIG. 2 depicts a small scale form of the invention in which the various servers are co-located in a single machine. In this case, the Local Server cache of Resource Aliases related records is not necessary, as the Local Server process may directly access the database of the Central Registry Server. Furthermore (as is also the case depicted in FIG. 1), the various servers should be thought of as cooperating processes (programs which are concurrently executing) which, in the case of FIG. 2, happen to be co-resident in the same computer. Various intermediate configurations are also possible, in which some but not all of the server processes co-located at the same site or computer. In this figure (FIG. 2), the various cooperating software components of the invention are depicted as circles and the sites or computers in which they are resident and executing are depicted as rectangles. It is expected that the software of this invention will generally be co-located with other software and will share the resources of their common host machine.

The server computer or site 201 may be a network server and may include the central registry server 202, and the Value Added Server 203, each communicating with and working in concert with the Local Server 204. The system may also include a plurality of client computers 205, each including the client functions and features 206. The clients illustrated in FIG. 2 correspond to the Clients 105 illustrated in FIG. 1.

Figure 3:
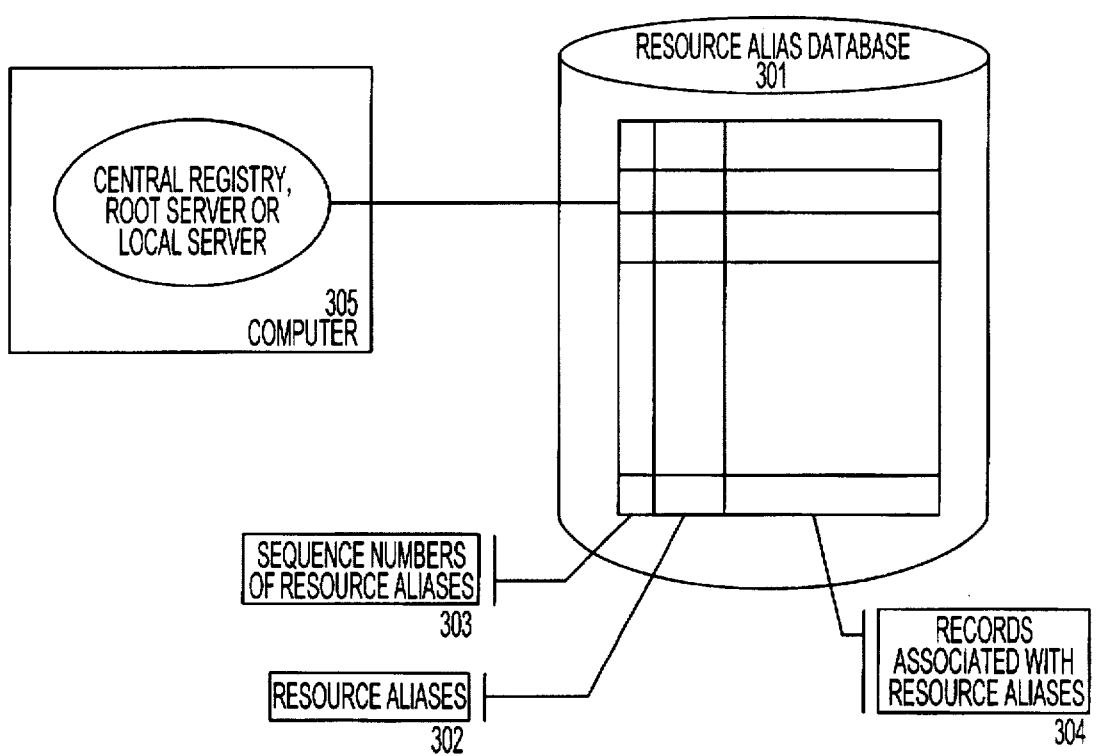
FIG. 3 shows a resource alias database.

FIG. 3 illustrates the database 301 of Resource Aliases 302 and their associated serial or sequence numbers 303 and Records 304 maintained by the Central Registry Server, a Root Server or a Local Server 305. While this database and its access structure are not identically used in these types of servers, the databases do have in common the following: (1) they are indexed for efficient retrieval of an item (a Resource Alias, its serial number and its Record) when requested either by supplying its Resource Alias or its serial number; (2) they may concurrently serve several requesters seeking retrieval of Resource Alias Records; and (3) they may alter, delete or add items with minimum interference to retrieval requests—that is, there is no need to halt retrieval services while update occurs. The Local Server database is its cache, containing only certain of the Resource Aliases and their Records, while the Central Registry maintains the entire collection of Resource Aliases in its database. A Root Server may be slightly out-of-phase with the Central Registry Server, and contain the entire Resource Alias collection current through the last update interaction with the Central Registry. FIG. 3 is not intended to limit the physical or logical structure of the database, as its structure may employ any accepted practice in structuring of data for efficient concurrent retrieval and rapid update.

Figure 4:
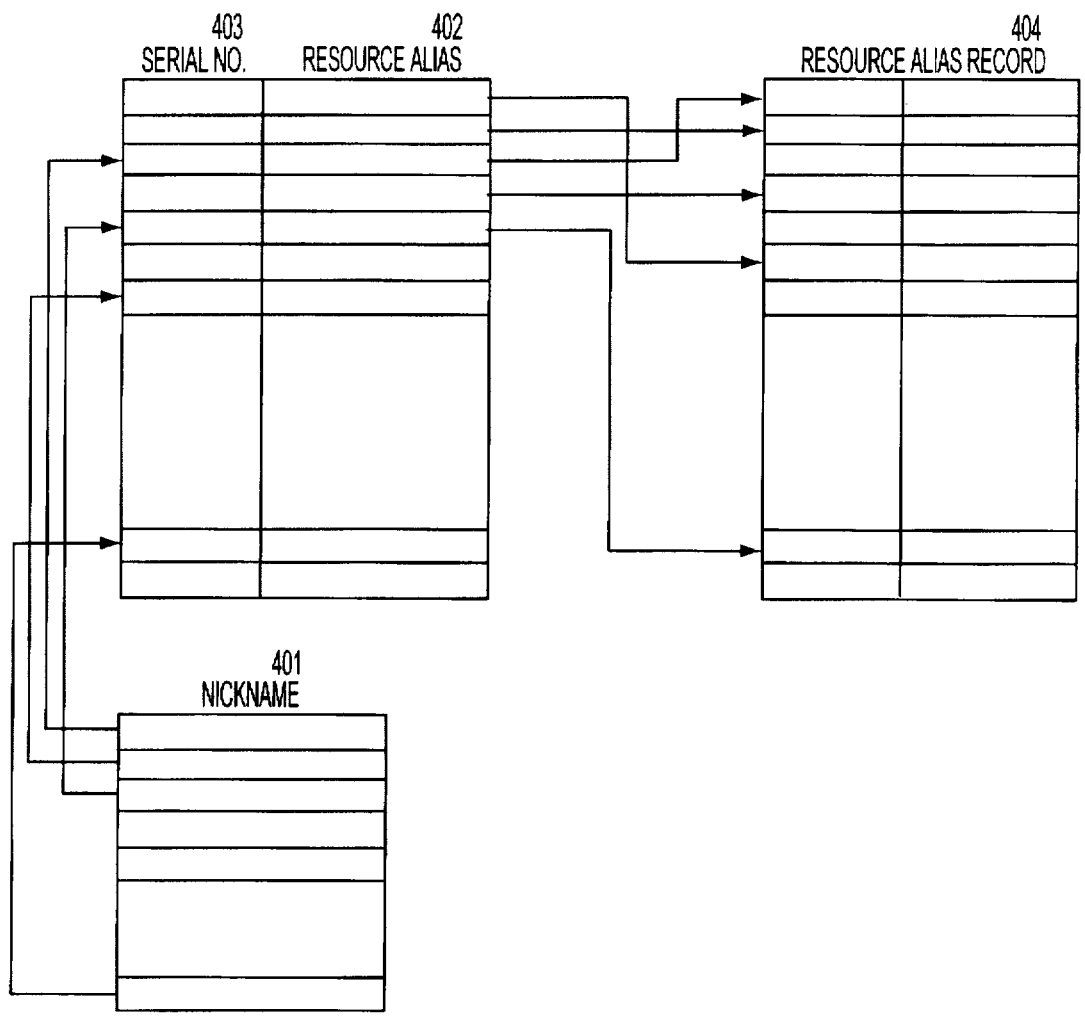
FIG. 4 shows a client nickname and Resource Alias Cache.

FIG. 4 depicts the cache (local store) of Resource Aliases which the Client maintains, together with the Nicknames which represent some subset of the Resource Aliases. This illustration is not meant to represent the actual structure of the Client database, but rather the logical association of Resource Aliases, their serial numbers and their Records, and the association of Nicknames to Resource Aliases. The Nickname space 401 and Resource alias space 402 will act as a single space when a user requests a Resource Alias Record or attempts to access the Electronic Resource associated with a Resource Alias. The dual space is searched for the Resource Alias and/or Nickname, and the appropriate action is taken if it is found (or a request is submitted to the Local Server if it is not found). In actual implementation, 2a any of various methods for storing Nicknames. Resource Aliases and Serial Numbers may be used so that the search and update mechanisms are appropriately efficient in the Client, such as serial search, hash coding, and/or inverted lists.

The Client Nicknames 401 may be associated with Resource Aliases 402 or Resource Alias serial numbers 403. The Resource Alias and serial numbers are associated with the remaining fields of the Resource Alias Record 404.

Figure 5:
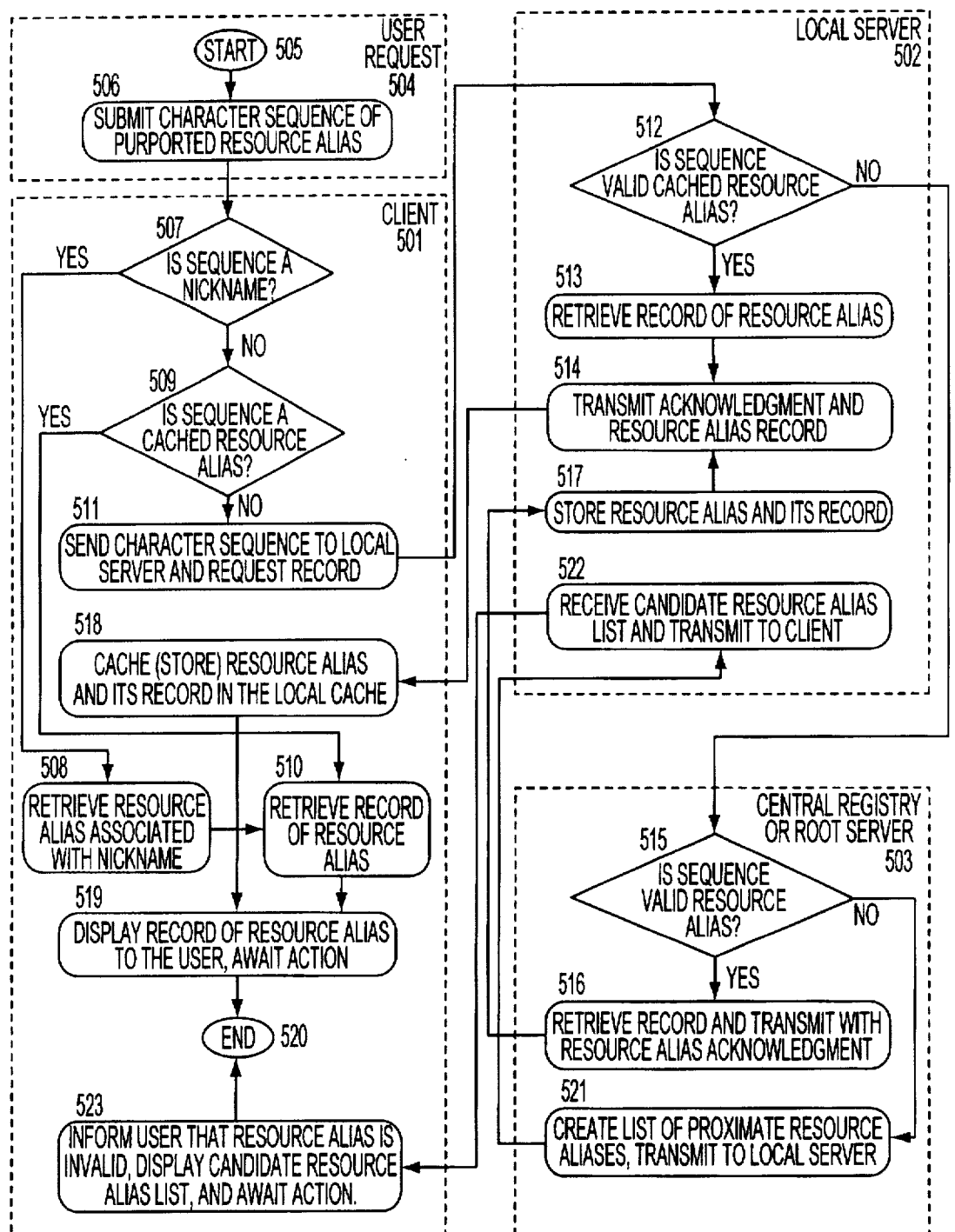
FIG. 5 shows the flow of handling of user requests for Resource alias data.

FIG. 5 illustrates the procedure associated with a user request for the Record associated with a Nickname or Resource Alias. This Record may be used for perusal on screen or for request for the delivery of an Electronic Resource associated with the Nickname or Resource Alias. The illustration separates the processing of the requests into logical regions, processed by different (cooperating) processes. The Client process 501 is depicted as first searching its own cache via the Nickname or Resource Alias space for the record. That failing, the Client 501 requests the Record from its Local Server 502. If the Local Server 502 does not have that data cached, it requests it of the Central Registry or of a Root Server 503. If the Record is located in any of those places, the process which finds it sends the Record back, and each of the processes receiving it caches it; finally the Record is displayed for the User. If the Resource Alias is not found anywhere, it is not a valid Resource alias, and the Root Server or Central Registry 503 formulates a reply in which a list of proximate Resource Aliases is returned. The Client process 501 displays this list to the user so he/she may visually peruse the list and choose likely candidates for further requests.

A user request 504 for an address is initiated by invoking the request process 505 through the submission of a character sequence of a purported Resource Alias 506. The Client process includes an inquiry into whether the sequence constitutes a Nickname 507. If so, the client process will retrieve the Resource Alias associated with the Nickname 508. If the sequence is not a Nickname, the Client process inquires into whether the sequence is a cached Resource Alias in the local Client Server 509. If it is determined that the sequence is a cached Resource Alias or, upon retrieval of a Resource Alias associated with a Nickname, the Client will then retrieve the Resource Alias record 510. In the event the character sequence is not a cached Resource Alias, the Client will send the character sequence to the local server and request a corresponding Resource Alias record at 511. Upon receipt of such a request, the local server will query its cached Resource Aliases at 512. If the sequence is a valid cached Resource Alias, the local service will retrieve the corresponding Resource Alias record at 513 and transmit acknowledgment of the inquiry and the Resource Alias record 514 back to the Client 501. If the local server finds that the sequence is not a valid cached Resource Alias at 512, it forwards the character sequence to the Central Registry or a Root Server 503. The Root Server then ascertains whether the sequence is a valid Resource Alias at 515. If so, the central registry or Root Server 503 retrieves the corresponding Resource Alias record and transmits the record with a Resource Alias acknowledgment 516 back to the local server 502. The local server will then store the Resource Alias and its corresponding record at 517 and transmit an acknowledgment along with the Resource Alias record at 514 back to the Client 501. Upon receipt of a Resource Alias and corresponding record from the local server 502, the Client 501 will store the Resource Alias and its corresponding record in the local Client cache 518. Upon confirmation of the validity of a character sequence as a Resource Alias at either step 510 or 518, the Client will display the Resource Alias record to the user at 519 and await further action. The request process ends at step 520. The further action may include the establishment of a Nickname for the returned Resource Alias or submission of an additional character sequence in connection with an address request. The system according to the invention may be linked with other operating modules which may use the address contained in the Resource Alias record to request a copy of the resource. At this point, any of the previously discussed value added services may also be invoked.

In the event that the local server 502 submits a character sequence purported to be a Resource Alias to the Central Registry or Root Server 503 and it is determined at 515 that the sequence is not a valid Resource Alias, the Central Registry or Root Server 503 may create a list of proximate Resource Aliases for transmission to the local server at step 521. The creation of the list of proximate Resource Aliases may be through some type of search which identifies Aliases which are syntactically and/or visually proximate to the submitted character sequence. The Central Registry or Root Server returns the list to the local server 502, which receives the candidate Resource Alias list and retransmits the list to the Client 501 at step 522. Upon receipt of the candidate Resource Alias list, the client informs the user that the submitted character sequence is not a valid Resource Alias and displays the candidate Resource Alias list at step 523 and awaits further action at step 520.

Figure 6:
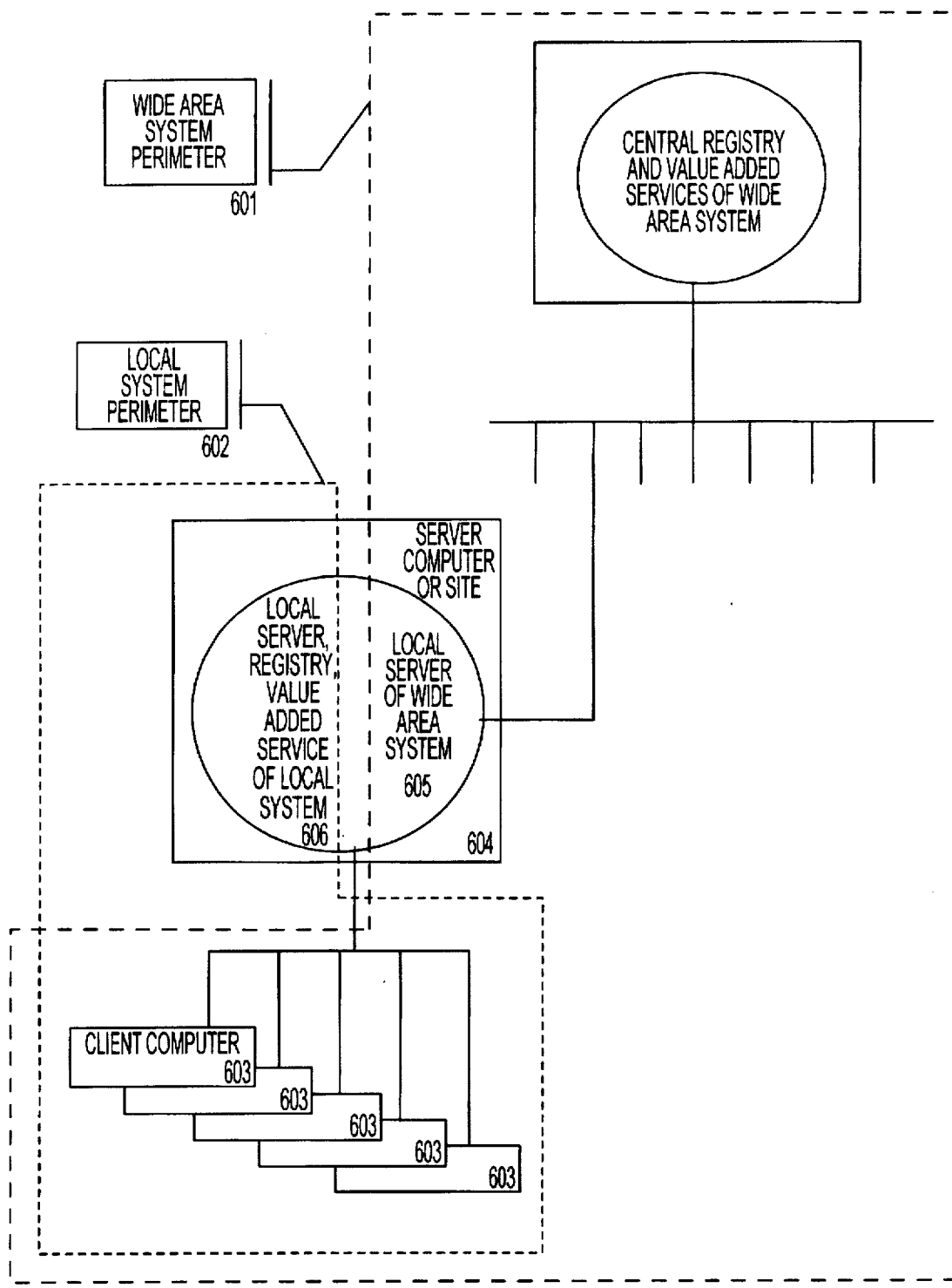
FIG. 6 shows dual implementation of a preferred embodiment.

FIG. 6 shows the preferred embodiment of this invention in a dual implementation, wherein the entire invention as described is implemented at two levels. The first is a universal implementation within the Internet and WWW community 601, providing a global aliasing service which may be used by any information provider with electronic resources available to Internet users. The second is one or more small scale implementation(s) 602 wherein a single Internet site and/or domain of one or more servers may provide an aliasing mechanism for denoting electronic resources for its immediate community of users. Thus, a user at or connected to such a site thus has available two disparate sets of denotations, one for global electronic resources of the entire Internet, and one for the local resources within his/her immediate community. The Client system 603 discerns between the two types of Resource Aliases (and their attendant Nicknames if such be used) by marking the first type "global" and the second type "local." The same Resource Alias may then be used in a global and local sense, wherein the local Resource Aliases "mask" global ones (are preferred during searches), but wherein the user may override this masking by requesting his/her Client system to seek out; one type or the other. The Local Server site 602 now acts as a Local Server for the global Resource Aliases 603, caching them in the manner described above, while it acts as the Central Registry for the local Resource Aliases 604, maintaining a database of all these Resource Aliases and their Records, and providing update, deletion and insertion services for local Resource Aliases and their records.

FIG. 6 depicts the organization of the dual implementation of the preferred embodiment of this invention. In this implementation, the Client system 603 provides the user with the choice of whether to prefer the Local or the Wide Area or Global (Internet) interpretations of Resource Aliases. This preference guides the Local Server 604 to search for a Resource Alias or character string purported to be a Resource Alias first in its Local Registry 606 or first in the Global system 605. If the preferred choice fails to match a Resource Alias, the secondary system (for that particular user) search is activated. Thus, each Client request is accompanied by system preference data. The Client User interface, in displaying lists of Resource Aliases or individual Resource Aliases and their associated Records, also displays whether that particular Resource Alias and Record are Local or Global (Wide Area or Internet). The Local Server 604 is advantageously linked with the Central Registry or Root Server and Value Added Services, 607, of the Wide Area System.

A fictional example of such usage is one wherein the U.S. Department of Agriculture registers a global Internet Source Alias "DOA" and an associated Resource Alias "DOA/Pathology" which provides information about animal or plant pathology resources, and wherein a hospital complex maintains an Internet domain which also serves as a Central Registry for local community Resource Aliases and registers a Source Alias "DOA" for information about "dead on arrival" and a Resource Alias "DOA/Pathology" for information about its pathology information database for DOD. A user of this community would elicit the local Resource Alias Record in response to a request for "DOD/Pathology" but could override this response by requesting global Resource Aliases. The local server would, in this case, request the Resource Alias Record from the Internet Central Registry on behalf of the Client and the User. Alternatively, the system could search the global, the local and the nickname caches for a sequence match and return all Resource Alias records corresponding to any match. The matching records would then be displayed for user selection or further action.

We claim:

1. An electronic resource denotation, request and delivery system within a network which shares information resources among its user community, comprising:

a central registry computer whose action is directed by software components, one or more local server computers whose actions are directed by software components and linked to the central registry computer;

one or more client computers whose actions are directed by software components, and linked to a local server computer;

wherein the software components in these computers operate in concert as a distributed entity to allow client computers to denote resources with aliases that are unique across said server computers and said client computers, and further allow client computers to retrieve information corresponding to said aliases; and wherein said aliases are maintained in at least said central registry computer and one or more of said local server computers.

2. The electronic resource denotation, request and delivery system of claim 1 further comprising:

computer memory associated with the central registry computer containing alias records of valid electronic resource aliases in said network and wherein said alias records contain electronic resource aliases and electronic resource addresses associated with said aliases; and wherein the central registry's computer software transmits at least a portion of an alias record to a local server computer on request.

3. The electronic resource denotation, request and delivery system of claim 2, further comprising:

one or more root server computers whose actions are directed by software components, associated with said central registry computer and linked to at least one of said local server computers; and computer memory associated with the root server computers.

4. The electronic resource denotation, request and delivery system of claim 3, wherein said computer memory associated with a root server computer contains copies of records stored in the computer memory associated with said central registry computer;

wherein a root server computer's software periodically requests the central registry computer for updates of all records that have been added, deleted or altered since the last update, and upon receipt of this update, stores the new or updated records in the computer memory associated with said root server computer; and wherein the software of a root server directs said root server to respond to a request for information in a manner similar to the central registry server.

5. The electronic resource denotation, request and delivery system of claim 4, wherein said software directs said root server computer to delete or invalidate records which correspond to said updated records or which have been superseded or deleted from the memory associated with said central registry computer.

6. The electronic resource denotation, request and delivery system of claim 3, further comprising:

computer memory associated with a local server computer containing copies of one or more of the alias records; and wherein the software periodically directs the local server computer to send a list of all the aliases of the records it currently retains together with the time and date of their last known update to a recipient computer, wherein said recipient computer is the central registry computer or a root server computer, and wherein the software directs the recipient computer to return a list of retained aliases whose records have since changed; and wherein the software directs the local server computer to delete or invalidate the records associated with those aliases from its associated computer memory.

7. The electronic resource denotation, request and delivery system of claim 3, further comprising:

computer memory associated with the client computer containing copies of one or more of the alias records; and wherein the software directs the client computers to accept requests for resource addresses by aliases from a user operating the client computer and to display the alias record corresponding an alias if said alias record is contained in the memory associated with the client computer; and if such an alias record is not present in the memory associated with the client computer to request that alias record from the local server so that it may be displayed or otherwise employed; and wherein the local server computer transmits that alias record if it is present in the computer memory associated with the local server computer; and wherein the local server computer requests the corresponding alias record from the central registry computer or a root server computer in order to fulfill a client computer request if that alias record is not present in the computer memory associated with said local server computer.

8. The electronic resource denotation, request and delivery system of claim 3 further comprising:

client computer software components which respond to a request by a user to retrieve an electronic resource associated with an alias by first retrieving the alias record corresponding to the alias from a local server computer if that alias record is not already stored in the client computer and then either (a) invoking further software components resident in the client computer capable of retrieving and displaying and/or storing the electronic resource, or (b) transmitting a resource delivery request to a value added server computer.

9. The electronic resource denotation request and delivery system of claim 8 wherein said resource delivery request specifies delivery by electronic mail or by facsimile or by postal service or by telephone.

10. The electronic resource denotation, request and delivery system of claim 3 further comprising:

client computer software components which periodically transmit a list of all resource aliases currently stored in said memory associated with said client computer together with times and dates the associated alias records were last updated to a local server computer; and local server computer software components which in response to said periodically transmitted list, determines which alias records corresponding to the transmitted resource aliases are no longer current, by (a) checking the computer memory associated with the local server and, (b) requesting alias records from the central registry computer or a root server which are not contained in the memory associated with the local server computer and retaining alias records received in response to said request in the memory associated with the local server for fulfillment of the current and future requests; and wherein the client computer, upon receipt of the list of aliases which are no longer current, deletes corresponding alias records from its associated computer memory.

11. The electronic resource denotation, request and delivery system of claim 7 further comprising:

client computer software components which respond to a user request to retrieve an electronic resource associated with a character sequence which does not correspond to an alias stored in computer memory in the system by transmitting that character sequence to a local server computer, which in turn transmits it to the central registry computer in order to seek a corresponding alias record; wherein the central registry computer responds by acknowledging the request, and transmitting to the client computer, via the local server computer, a list of candidate aliases which approximate the character sequence; and wherein the client computer displays said list for user selection.

12. The electronic resource denotation, request and delivery system of claim 11, wherein the candidate aliases are proximate to the character sequence in that they all begin with the same character sequence or that they are the result of minor changes in the requested character sequence such as (a) omitting one or several characters in the sequence or (b) inserting one or several additional characters in the sequence or (c) altering several characters in the sequence.

13. The electronic resource denotation, request and delivery system of claim 2 further comprising:

client computer software components which respond to a user request to create a new alias for an electronic resource by eliciting from the user record information including an electronic resource address; wherein the client computer transmits the new alias record to the central registry computer; wherein the central registry computer either (a) approves the new alias and stores its record if the character sequence of the alias is valid and not in use; and wherein the central registry computer sends acknowledgement of acceptance to the client computer, or (b) denies approval of the new alias and transmits the reason for denial to the client computer; and wherein the client computer informs the user of the central registry computer's decision.

14. The electronic resource denotation, request and delivery system of claim 13 wherein said record information further comprises a resource format, text describing the resource, and other aliases whose corresponding resources are related to the resource.

15. The electronic resource denotation, request and delivery system of claim 2 further comprising:

client computer software components which respond to a user request to create a personal alias or nickname for an alias which is stored in associated computer memory by storing the personal alias and associating it with the resource alias; and wherein thereafter, in response to a request for the record corresponding to the personal alias or the request for the electronic resource associated with that personal alias, the software responds in the same manner as it would if the corresponding resource alias were used.

16. An electronic resource denotation, request and delivery system within a network which shares information resources among its user community, comprising:

a registry computer whose action is directed by software components;

one or more client computers whose actions are directed by software components, and linked to a registry computer; wherein the software components in these computers operate in concert as a distributed entity to allow client computers to denote resources with aliases that are unique across said registry computer and said client computers, and further allow client computers to retrieve information corresponding to said aliases; a wherein said aliases are maintained in at least said registry computer and one or more of said client computers.

17. The electronic resource denotation, request and delivery system of claim 16 further comprising:

computer memory associated with the registry computer containing alias records of valid electronic resource aliases in said network and wherein said alias records contain electronic resource aliases and electronic resource addresses associated with said aliases; and wherein the registry's computer software transmits at least a portion of an alias record to a client computer on request.

18. The electronic resource denotation, request and delivery system of claim 17, further comprising:

one or more mirror registry computers whose actions are directed by software components, associated with a central registry computer and linked to sat least one of said client computers; and computer memory associated with the mirror registry computers.

19. The electronic resource denotation, request and delivery system of claim 18, wherein said computer memory associated with a mirror registry computer contains copies of records stored in the computer memory associated with said registry computer;

wherein a mirror registry computer's software periodically requests the registry computer for updates of all records that have been added, deleted or altered since the last update, and upon receipt of this update, stores the new or updated records in the computer memory associated with said mirror registry computer; and wherein the software of a mirror registry computer directs said mirror registry computer to respond to a request for information in a manner similar to the central registry server.

20. The electronic resource denotation, request and delivery system of claim 19, wherein said software directs said mirror registry computer to delete or invalidate records which correspond to said updated records or which have been superseded or deleted from the memory associated with said central registry computer.

21. The electronic resource denotation, request and delivery system of claim 18, further comprising:

computer memory associated with a client computer containing copies of one or more of the alias records; and wherein the software periodically directs the client computer to send a list of all the aliases of the records it currently retains together with the time and date of their last known update to a recipient computer, wherein said recipient computer is the central registry computer or a mirror registry computer, and wherein the software directs the recipient computer to return a list of retained aliases whose records have since changed; and wherein the software directs the local server computer to delete or invalidate the records associated with those aliases from its associated computer memory.

22. The electronic resource denotation, request and delivery system of claim 18, further comprising:

computer memory associated with the client computer containing copies of one or more of the alias records; and wherein the software directs the client computers to accept requests for resource addresses by aliases from a user operating the client computer and to display the alias record corresponding an alias if said alias record is contained in the memory associated with the client computer; and if such an alias record is not present in the memory associated with the client computer to request that alias record from an associated registry computer so that it may be displayed or otherwise employed; and wherein the associated registry computer transmits that alias record if it is present in the computer memory associated with the associated registry computer.

23. The electronic resource denotation, request and delivery system of claim 18 further comprising:

client computer software components which respond to a request by a user to retrieve an electronic resource associated with an alias by first retrieving the alias record corresponding to the alias from an associated registry computer if that alias record is not already stored in the client computer and then either (a) invoking further software components resident in the client computer capable of retrieving and displaying and/or storing the electronic resource, or (b) transmitting a resource delivery request to a value added server computer.

24. The electronic resource denotation request and delivery system of claim 23 wherein said resource delivery request specifies delivery by electronic mail or by facsimile or by postal service or by telephone.

25. The electronic resource denotation, request and delivery system of claim 18 further comprising:

client computer software components which periodically transmit a list of all resource aliases currently stored in said memory associated with said client computer together with times and dates the associated alias records were last updated to a mirror registry computer; and mirror registry computer software components which in response to said periodically transmitted list, determines which alias records corresponding to the transmitted resource aliases are no longer current, by (a) checking the computer memory associated with the mirror registry computer and, (b) requesting alias records from the registry computer which are not contained in the memory associated with the mirror registry computer and retaining alias records received in response to said request in the memory associated with the mirror registry computer for fulfillment of the current and future requests; and wherein the client computer, upon receipt of the list of aliases which are no longer current, deletes corresponding alias records from its associated computer memory.

26. The electronic resource denotation, request and delivery system of claim 22 further comprising:

client computer software components which respond to a user request to retrieve an electronic resource associated with a character sequence which does not correspond to an alias stored in computer memory in the system by transmitting that character sequence to a registry computer in order to seek a corresponding alias record; wherein the registry computer responds by acknowledging the request, and transmitting to the client computer a list of candidate aliases which approximate the character sequence; and wherein the client computer displays said list for user selection.

27. The electronic resource denotation, request and delivery system of claim 26, wherein the candidate aliases are proximate to the character sequence in that they all begin with the same character sequence or that they are the result of minor changes in the requested character sequence such as (a) omitting one or several characters in the sequence or (b) inserting one or several additional characters in the sequence or (c) altering several characters in the sequence.

28. The electronic resource denotation, request and delivery system of claim 17 further comprising:

client computer software components which respond to a user request to create a new alias for an electronic resource by eliciting from the user record information including an electronic resource address; wherein the client computer transmits the new alias record to a registry computer; wherein the registry computer either (a) approves the new alias and stores its record if the character sequence of the alias is valid and not in use; and wherein the registry computer sends acknowledgement of acceptance to the client computer, or (b) denies approval of the new alias and transmits the reason for denial to the client computer; and wherein the client computer informs the user of the registry computer's decision.

29. The electronic resource denotation, request and delivery system of claim 28 wherein said record information further comprises a resource format, text describing the resource, and other aliases whose corresponding resources are related to the resource.

30. The electronic resource denotation, request and delivery system of claim 17 further comprising:

client computer software components which respond to a user request to create a personal alias or nickname for an alias which is stored in associated computer memory by storing the personal alias and associating it with the resource alias; and wherein thereafter, in response to a request for the record corresponding to the personal alias or the request for the electronic resource associated with that personal alias, the software responds in the same manner as it would if the corresponding resource alias were used.

31. A method for aliasing electronic resources comprising the steps of:

entering an alias into a client computer and polling an associated memory for an electronic resource address associated with said alias;

using said alias to poll a memory associated with a local server for an address corresponding to said alias if said address is not in said client computer memory;

using said alias to poll a memory associated with a master server for an address corresponding to said alias if said address is not in said local server memory; and returning the results of the polls to the client computer; where the results of the poll include an address coupled to the alias if a corresponding address is found.

* * * * *